(12) United States Patent
Wang

(10) Patent No.: US 12,667,094 B2
(45) Date of Patent: Jun. 30, 2026

(54) PORTABLE LASER MOSQUITO KILLING APPARATUS

(71) Applicant: Chuan Wang, Jiangsu (CN)

(72) Inventor: Chuan Wang, Jiangsu (CN)

( * ) Notice: Subject to any disclaimer, the term of this patent is extended or adjusted under 35 U.S.C. 154(b) by 0 days.

(21) Appl. No.: 19/478,811

(22) PCT Filed: Mar. 20, 2025

(86) PCT No.: PCT/CN2025/083736
§ 371 (c)(1),
(2) Date: Oct. 25, 2025

(87) PCT Pub. No.: WO2025/162503
PCT Pub. Date: Aug. 7, 2025

(65) Prior Publication Data
US 2026/0130355 A1     May 14, 2026

(30) Foreign Application Priority Data

Feb. 1, 2024    (CN) ......................... 202420241484.8

(51) Int. Cl.
*A01M 1/22*          (2006.01)
(52) U.S. Cl.
CPC ....... *A01M 1/226* (2013.01); *A01M 2200/012* (2013.01)
(58) Field of Classification Search
CPC .................................................. A01M 1/226
(Continued)

(56) References Cited

U.S. PATENT DOCUMENTS

| | | | | |
|---|---|---|---|---|
| 7,649,664 B1 * | 1/2010 | Shih | ................... | G02B 13/0005 |
| | | | | 359/206.1 |
| 10,729,124 B2 * | 8/2020 | Marka | ..................... | F21V 14/04 |

(Continued)

FOREIGN PATENT DOCUMENTS

| | | | | |
|---|---|---|---|---|
| CN | 106719524 A | * | 5/2017 | .............. A01M 5/00 |
| CN | 207561228 U | * | 7/2018 | |

(Continued)

OTHER PUBLICATIONS

Written Opinion of the International Searching Authority for corresponding PCT Application No. PCT/CN2025/083736, filed Mar. 20, 2025, 5 pages.

*Primary Examiner* — Christopher P Ellis
(74) *Attorney, Agent, or Firm* — Birchwood IP

(57)          ABSTRACT

A portable laser mosquito killing apparatus, comprising a protective housing (1) and a galvanometer driving module (10) fixed on a central fixing member (2). One side of the central fixing member (2) is further provided with a lidar (4), and a galvanometer lens (5) which can rotate is drivingly connected to the galvanometer driving module (10). A high-power laser module (6) is further fixedly mounted on the central fixing member (2), and the lidar (4) comprises an infrared laser receiving part (401) and an infrared laser emitting part (402). The central fixing member (2) is further provided with a main dichroscope (8) corresponding to the infrared laser emitting part (402) and the high-power laser module (6). The laser emitted by the high-power laser module (6), the laser emitted by the infrared laser emitting part (402) and the return light received by the infrared laser receiving part (401) control a reflection angle by means of the same galvanometer lens (5), and the reflection points of the high-power laser module (6), the infrared laser emitting part (402) and the infrared laser receiving part (401) on the galvanometer lens (5) can completely overlap or are located (Continued)

on the same straight line. Using a galvanometer lens of a galvanometer module can achieve scanning action and killing action, thus allowing for low production cost and easy maintenance. In addition, the apparatus can be used both indoors and outdoors, thus having rich use scenarios, and large coverage areas.

8 Claims, 6 Drawing Sheets

(58) Field of Classification Search
USPC ........................................................ 43/132.1
See application file for complete search history.

(56) References Cited

U.S. PATENT DOCUMENTS

| | | | | |
|---|---|---|---|---|
| 2010/0194843 A1* | 8/2010 | Sakai | ................... | G02B 26/127 |
| | | | | 347/243 |
| 2015/0040466 A1* | 2/2015 | Bolen | ................... | A01M 1/023 |
| | | | | 43/144 |
| 2025/0008939 A1* | 1/2025 | Fuji | ....................... | A01M 1/226 |

FOREIGN PATENT DOCUMENTS

| | | | | | |
|---|---|---|---|---|---|
| CN | 109964898 A | * | 7/2019 | ............ | A01M 1/226 |
| CN | 218571233 U | | 3/2023 | | |
| CN | 118202983 A | * | 6/2024 | .............. | A01M 1/04 |
| CN | 118370294 A | * | 7/2024 | ............ | A01M 1/226 |
| CN | 115281165 B | * | 8/2024 | ............. | G01B 11/00 |
| CN | 120501096 A | * | 8/2025 | ........... | G01N 33/004 |
| WO | WO-2013069059 A1 | * | 5/2013 | ............ | A01M 1/226 |

* cited by examiner

PORTABLE LASER MOSQUITO KILLING APPARATUS

TECHNICAL FIELD

The utility model relates to the field of mosquito extermination equipment, in particular relates to a portable laser mosquito extermination device.

BACKGROUND OF THE INVENTION

A laser mosquito extermination device is a type of equipment that uses laser technology to eliminate mosquitoes. It first identifies mosquitoes through a camera or infrared scanning, then accurately targets and hits the mosquitoes with a high-energy laser beam, featuring high mosquito-killing efficiency. Compared with traditional insecticides or electric shock-type mosquito killers, laser mosquito extermination devices do not require the use of chemicals or electric current, making them safer and free from harm to the human body and the environment. Additionally, these devices possess precise targeting and striking capabilities, enabling them to selectively eliminate mosquitoes and reduce impacts on other insects or animals. Unlike traditional electric shock-type mosquito killers, laser mosquito extermination devices produce no noise and thus do not disturb people's rest and sleep.

However, existing laser mosquito extermination devices have drawbacks: they are relatively large in size and low in portability, making them unsuitable for ordinary consumers. Meanwhile, traditional laser mosquito extermination devices are usually designed for indoor use, and their effectiveness may be poor when used for outdoor or large-area mosquito control. Moreover, traditional laser mosquito extermination devices typically adopt multiple sets of galvanometer modules, resulting in high production costs. Therefore, there is an urgent need in the market for a laser mosquito extermination device that is easy to carry and suitable for both indoor and outdoor use.

BRIEF SUMMARY OF THE INVENTION

To address the above-mentioned issues, the utility model aims to provide a portable laser mosquito extermination device.

To achieve this technical objective, the solution of the utility model is as follows: a portable laser mosquito extermination device, characterized by comprising a protective housing and a galvanometer drive module fixed to a central fixing component, wherein a laser radar is further disposed on one side of the central fixing component; the galvanometer drive module is drivingly connected with a rotatable galvanometer lens; a high-power laser module is further fixedly mounted on the central fixing component; the laser radar consists of an infrared laser receiving unit and an infrared laser emitting unit;

the central fixing component is further equipped with a main dichroic mirror corresponding to the infrared laser emitting unit and the high-power laser module; a laser emitted by the high-power laser module, a laser emitted by the infrared laser emitting unit, and a returned light received by the infrared laser receiving unit are all controlled in terms of reflection angle by the same galvanometer lens, and their reflection points on the galvanometer lens can either completely coincide or be located on the same straight line.

As a preferred option, a partition plate is further mounted on the central fixing component, wherein the partition plate is capable of separating the infrared laser receiving unit and the infrared laser emitting unit to the left and right sides respectively.

As a preferred option, when the main dichroic mirror is of a long-wave high-reflection and short-wave high-transmission type, the laser emitted by the infrared laser emitting unit can be reflected by the main dichroic mirror and then projected onto a reflection area on the galvanometer lens, while the laser emitted by the high-power laser module can pass through the main dichroic mirror and be transmitted onto the same reflection area on the galvanometer lens;

when the main dichroic mirror is of a long-wave high-transmission and short-wave high-reflection type, the laser emitted by the infrared laser emitting unit can pass through the main dichroic mirror and be transmitted onto the reflection area on the galvanometer lens, while the laser emitted by the high-power laser module can be reflected by the main dichroic mirror and then projected onto the same reflection area on the galvanometer lens.

As a preferred option, the wavelength of the laser emitted by the infrared laser emitting unit is 700-1800 nm, and the wavelength of the laser emitted by the high-power laser module is different from that of the laser emitted by the infrared laser emitting unit.

As a preferred option, the included angle between the laser emitted by the infrared laser emitting unit and the laser emitted by the high-power laser module, after both are reflected by the galvanometer lens, is 0-20 degrees.

As a preferred option, the protective housing is composed of a box body and side covers, wherein the box body and the side covers are fixedly connected by means of snap fasteners or screws; a waterproof rubber ring is further installed between the box body and the side covers; the front side of the box body is further provided with control buttons and a laser transceiver window;

the front side of the box body is further provided with a pyroelectric sensor, an ultrasonic sensor, or an area-array laser radar, all of which are used for identifying large-sized organisms.

As a preferred option, a connecting base with a built-in magnet is arranged on the back of the protective housing, and the connecting base can be magnetically attached to an adjustable support or a rotary pan-tilt head.

As a preferred option, the main dichroic mirror is of a long-wave high-reflection and short-wave high-transmission type; the high-power laser module is composed of a high-power laser emitter, a reflecting mirror and a lens group; the laser emitted by the high-power laser emitter is focused or collimated by the lens group, then passes through the reflecting mirror and the main dichroic mirror, and is finally projected onto the galvanometer lens;

the infrared laser emitting unit of the laser radar includes a laser diode and at least one first convex lens; the laser emitted by the laser diode is collimated by the first convex lens, then passes through the main dichroic mirror, and is reflected by the galvanometer lens to the outside of the laser transceiver window;

the infrared laser receiving unit includes a photosensitive sensor and at least one second convex lens; the main dichroic mirror reflects the returned light from the galvanometer lens to the second convex lens, which focuses the light onto the photosensitive sensor, wherein the reflection areas of the returned light and the laser emitted by the laser diode on the galvanometer lens are different and located on both sides of the partition plate.

As a preferred option, the high-power laser module further includes a fixing frame; the left and right sides of the top of the fixing frame are respectively provided with a first fixing inclined surface and a second fixing inclined surface; the main dichroic mirror is attached to the first fixing inclined surface; the reflecting mirror is fixed on the second fixing inclined surface; the area of the reflecting mirror is smaller than that of the main dichroic mirror; and the included angle between the reflecting mirror and the main dichroic mirror is 30 degrees-60 degrees.

The beneficial effects of the utility model are as follows: The structure of the present application is compact and easy to carry. By driving both the receiving and transmitting functions of the radar simultaneously, the detection capability and detection distance of the radar are effectively improved; in addition, the partition plate can eliminate the influence of internal reflection, further enhancing the detection performance. The device can cooperate with the rotation of the pan-tilt head to form a larger three-dimensional scanning and mosquito-killing space with a maximum range of 360 degrees. Meanwhile, through the cooperation of the reflecting mirror between the laser radar and the high-power laser emitter, both the scanning action and the killing action can be realized by using the galvanometer lens of a single set of galvanometer module, which results in low production cost and easy maintenance. Moreover, the structure of the present application is suitable for both indoor and outdoor use, featuring rich application scenarios and a wide coverage area.

DETAILED DESCRIPTION OF THE INVENTION

Figure 1:
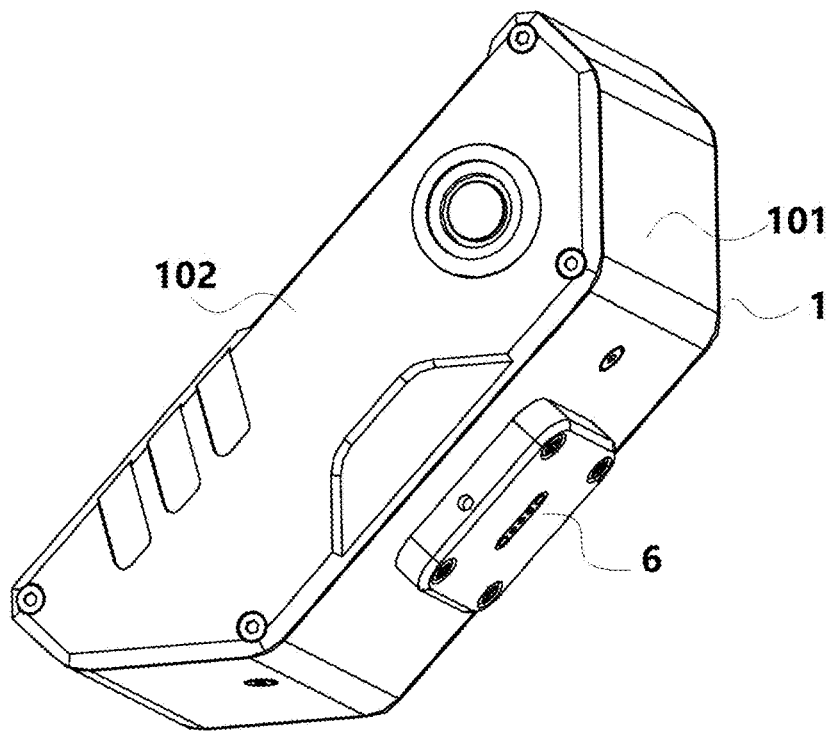
FIG. 1 is a structural schematic diagram of the utility model.
Figure 2:
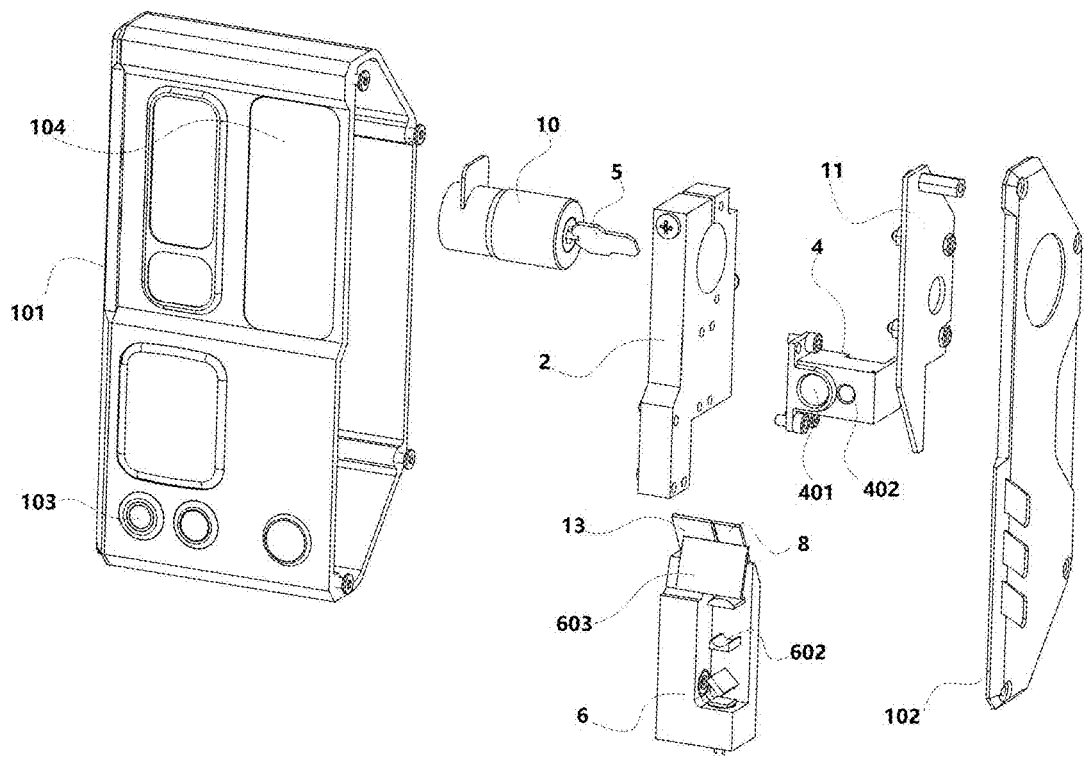
FIG. 2 is an exploded view of the utility model.
Figure 3:
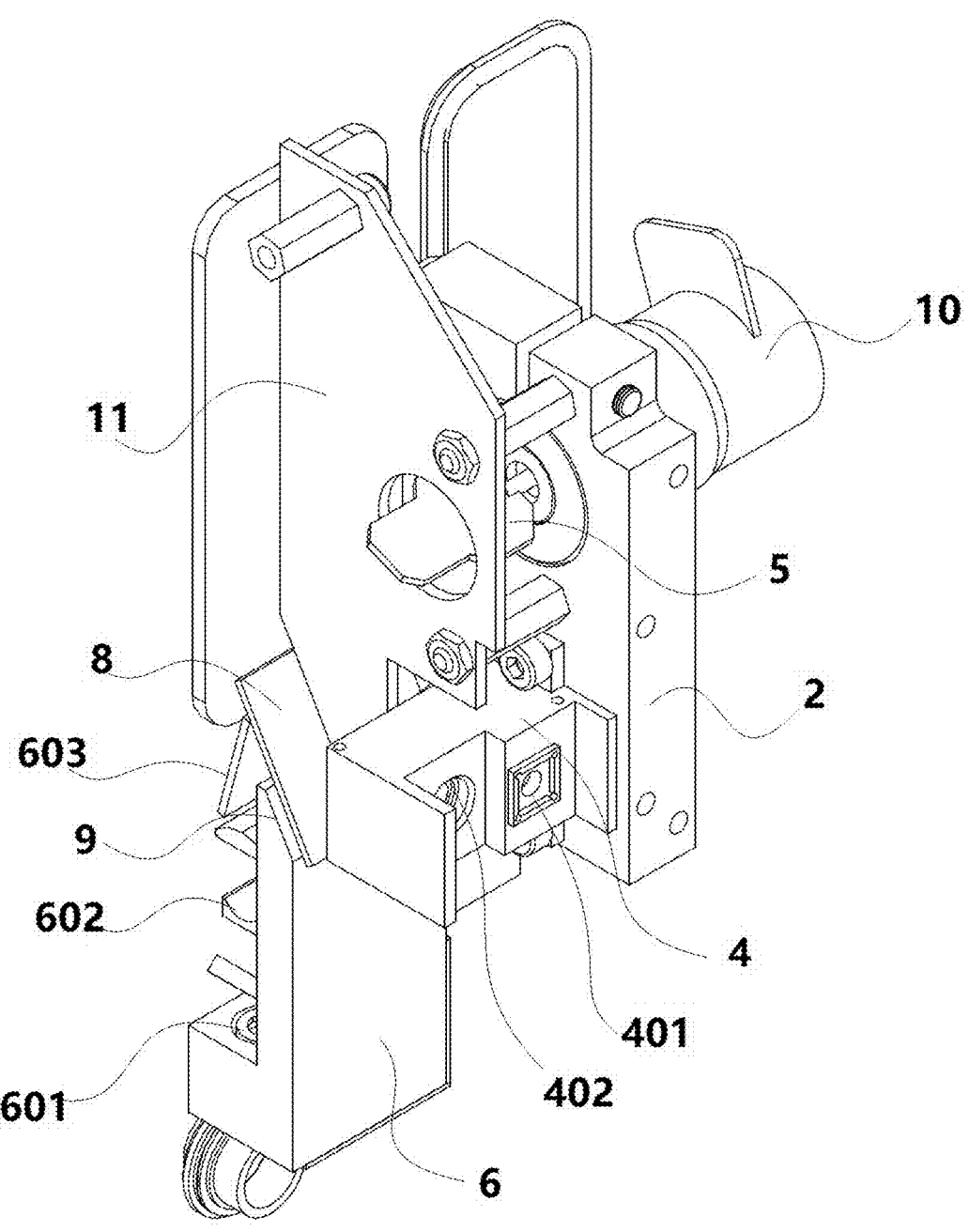
FIG. 3 is a partial structural schematic diagram of the utility model.
Figure 4:
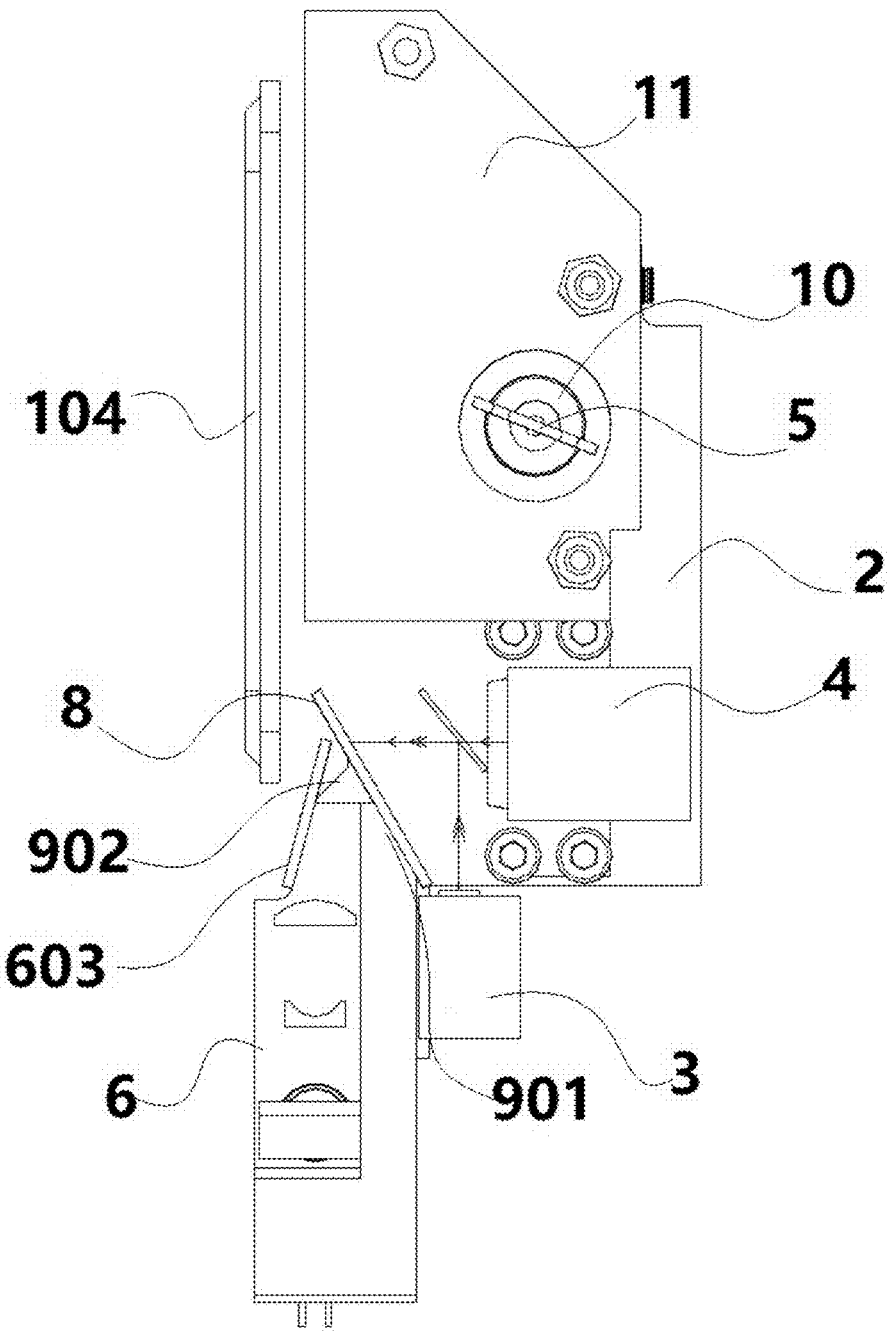
FIG. 4 is a partial structural schematic diagram of the side view of the utility model.

The utility model of the present application will be described in further details below with reference to the accompanying drawings and specific embodiments. In order to clearly and completely describe the technical solution, the following embodiments are selected for illustration; based on the contents recited in the present application, other embodiments obtained without making creative efforts shall all fall within the protection scope of the utility model.

In the following embodiments, it should be noted that the orientations or positional relationships indicated by terms such as "upper", "lower", "left", "right", "inner", "outer", and "top/bottom" are all based on the orientations or positional relationships shown in the accompanying drawings. These terms are only used to clearly describe the present embodiments, and do not indicate or imply that the device or element referred to must have a specific orientation. Therefore, they shall not be construed as limiting the present application.

As shown in FIGS. 1-9, the specific embodiment of the utility model is a portable laser mosquito extermination device, which comprises a protective housing 1 and a galvanometer drive module 10 fixed on a central fixing component 2. A laser radar 4 is further disposed on one side of the central fixing component 2. The galvanometer drive module 10 is drivingly connected with a rotatable galvanometer lens 5. A high-power laser module 6 is further fixedly mounted on the central fixing component 2. The laser radar 4 consists of an infrared laser receiving unit 401 and an infrared laser emitting unit 402; the galvanometer drive module 10 may be a galvanometer motor or a MEMS micro-galvanometer.

The central fixing component 2 is further equipped with a main dichroic mirror 8 corresponding to the infrared laser emitting unit 402 and the high-power laser module 6.

To enable a single galvanometer lens to uniformly control the laser and the returned light, the laser emitted by the high-power laser module 6, the laser emitted by the infrared laser emitting unit 402, and the returned light received by the infrared laser receiving unit 401 are all controlled in terms of reflection angle by the same galvanometer lens 5, and their reflection points on the galvanometer lens 5 can either completely coincide or be located on the same straight line. That is, the emitted scanning laser, striking laser, and scanning returned light are in a coplanar state on the side of the laser transceiver window corresponding to the galvanometer; the three light beams can be in any state among parallel, coincident, or intersecting. A returned light reflecting lens 13 is further disposed on one side of the main dichroic mirror, and the returned light can be reflected by the returned light reflecting lens into the infrared laser receiving unit 401.

A partition plate 11 is further mounted on the central fixing component 2, wherein the partition plate 11 is capable of separating the infrared laser receiving unit 401 and the infrared laser emitting unit 402 to the left and right sides respectively.

A through hole is further provided on the partition plate, and the galvanometer lens can rotate through the through hole.

The wavelength of the laser emitted by the infrared laser emitting unit 402 is 700-1800 nm, and the wavelength of the laser emitted by the high-power laser module 6 is different from that of the laser emitted by the infrared laser emitting unit 402. The included angle between the laser emitted by the infrared laser emitting unit 402 and the laser emitted by the high-power laser module 6, after both are reflected by the galvanometer lens 5, is 0-20 degrees.

To facilitate installation and disassembly, the protective housing 1 is composed of a box body 101 (which can be of a trapezoidal structure or right-angled triangular structure, facilitating installation on the top corner of a window) and side covers 102. The box body 101 and the side covers 102 are fixedly connected by means of snap fasteners or screws. The front side of the box body 101 is further provided with control buttons 103 and a laser transceiver window 104.

Figure 5:
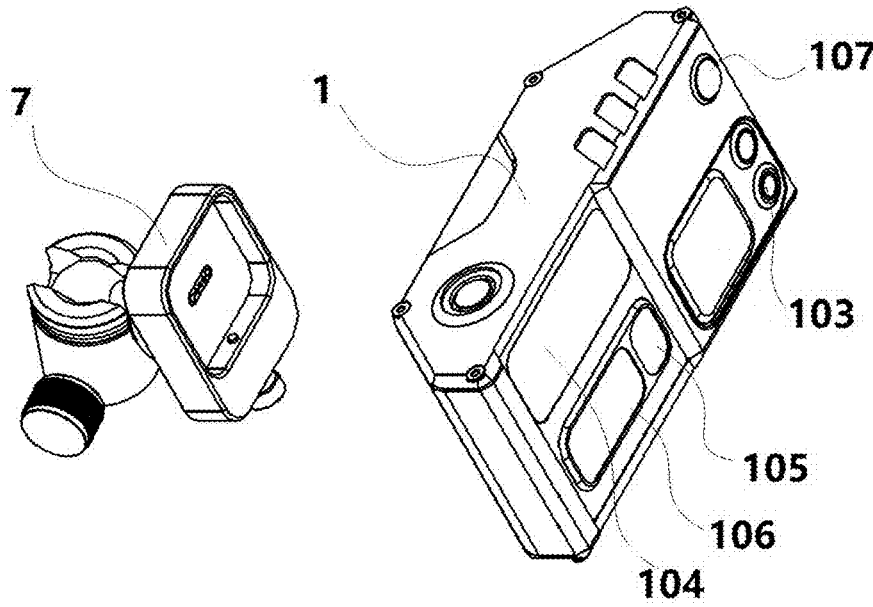
FIG. 5 is a structural schematic diagram of the utility model with an adjustable support.
Figure 6:
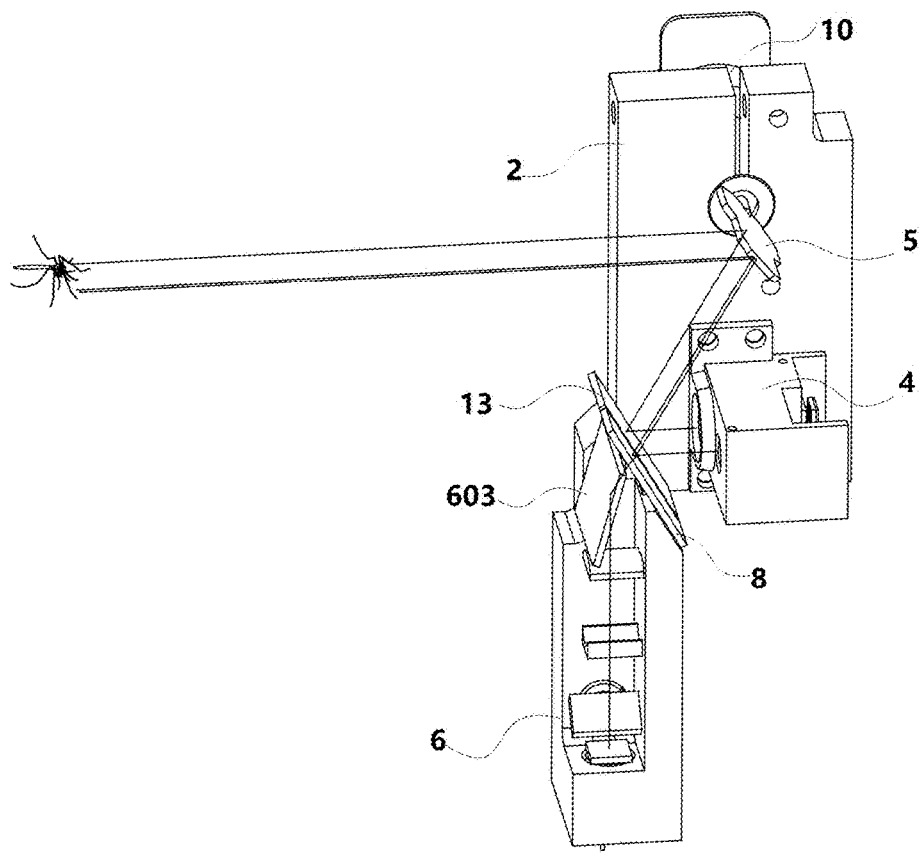
FIG. 6 is an optical path diagram of the utility model.

As shown in FIG. 5, to facilitate the identification of people or animals in the surrounding area, a laser area-array radar 105 and a millimeter-wave radar 106 are disposed on the front side of the box body 101; the front side of the box body 101 is further provided with a pyroelectric sensor 107 or an ultrasonic sensor.

To facilitate automatic angle adjustment for a larger scanning range and mosquito-killing space, a connecting base 6 with a built-in magnet is arranged on the back of the protective housing 1. The connecting base 6 can be magnetically attached to an adjustable support 7 (for manual angle adjustment) or a rotary pan-tilt head 14 (for automatic rotation scanning).

To achieve the optimal mosquito-killing effect, the high-power laser module 6 is composed of a high-power laser emitter 601 and a lens group 602. The laser emitted by the high-power laser emitter 6 is focused or collimated by the lens group 602, then passes through the main dichroic mirror and reaches the galvanometer lens.

The main dichroic mirror 8 is of a long-wave high-reflection and short-wave high-transmission type. The high-power laser module 6 is composed of a high-power laser emitter 601, a reflecting mirror 603 and a lens group 602; the laser emitted by the high-power laser emitter is focused or collimated by the lens group, then passes through the reflecting mirror and the main dichroic mirror, and is finally projected onto the galvanometer lens.

The infrared laser emitting unit 402 of the laser radar 4 includes a laser diode and at least one first convex lens; the laser emitted by the laser diode is collimated by the first convex lens, then passes through the main dichroic mirror, and is reflected by the galvanometer lens to the outside of the laser transceiver window.

The infrared laser receiving unit 401 includes a photosensitive sensor and at least one second convex lens; the main dichroic mirror reflects the returned light from the galvanometer lens to the second convex lens, which focuses the light onto the photosensitive sensor, wherein the reflection areas of the returned light and the laser emitted by the laser diode on the galvanometer lens are different and located on both sides of the partition plate.

To achieve a better scanning effect, an auxiliary laser radar 3 and an auxiliary dichroic mirror are further fixedly mounted below one side of the central fixing component 2. The laser emitted by the auxiliary laser radar 3 is reflected by the auxiliary dichroic mirror to the galvanometer lens. The auxiliary laser radar and the laser radar have different wavelengths, and their light beams can be coupled through the auxiliary dichroic mirror. Meanwhile, the emission light spot of the auxiliary laser radar is larger, enabling it to detect larger objects and objects within a slightly wider range, thereby preventing accidental injury to people or animals; the laser radar, on the other hand, is mainly used to detect small objects such as mosquitoes.

The high-power laser module 6 further includes a fixing frame 9; the left and right sides of the top of the fixing frame 9 are respectively provided with a first fixing inclined surface 901 and a second fixing inclined surface 902; the main dichroic mirror 8 is attached to the first fixing inclined surface 901; the reflecting mirror 603 is fixed on the second fixing inclined surface 902; and the included angle between the reflecting mirror 603 and the main dichroic mirror 8 is 30 degrees-60 degrees.

Figure 7:
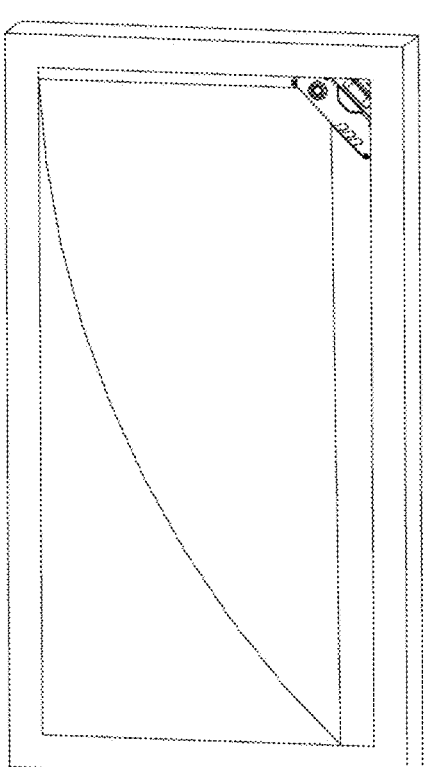
FIG. 7 is a reference diagram of the utility model in use on doors and windows.
Figure 8:
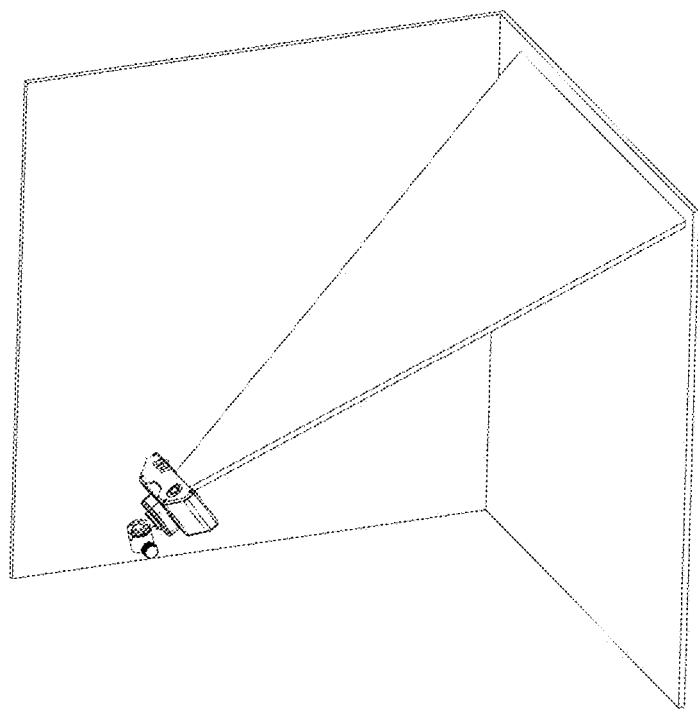
FIG. 8 is a reference diagram of the utility model in use when projected onto a wall.
Figure 9:
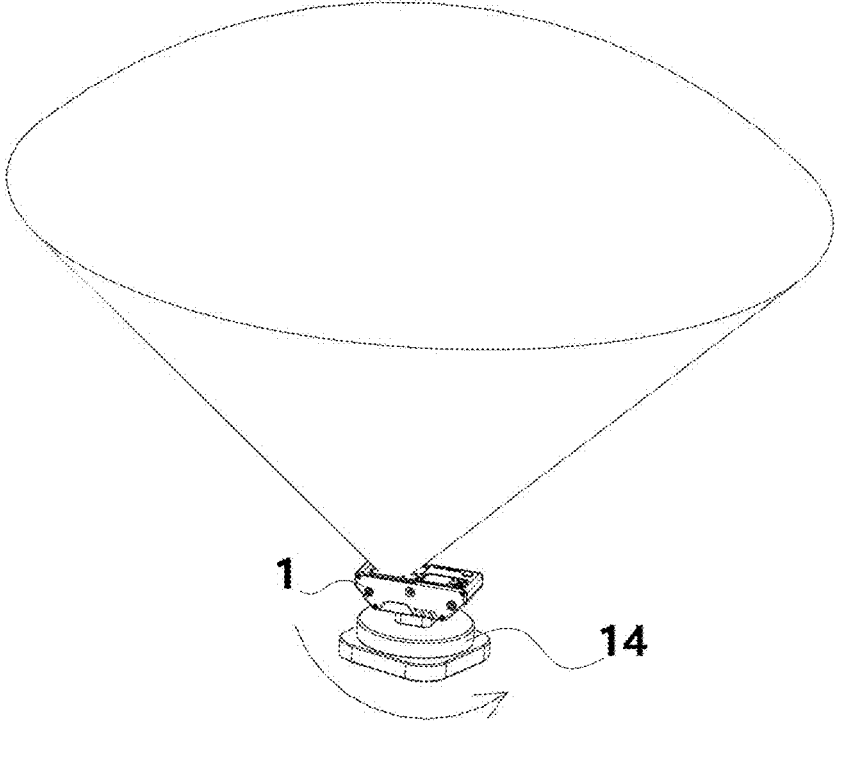
FIG. 9 is a reference diagram of the utility model in use when matched with a rotary pan-tilt head.

Specific application scenarios are shown in FIGS. 7-9. As illustrated in FIG. 7, when placed at a door or window, the device can form a mosquito-killing scanning surface with almost no blind spots across the entire door or window area. As shown in FIG. 8, in indoor scenarios, the device can be fixed on a wall, a tabletop, or other surfaces; it can form a triangular or fan-shaped mosquito-killing scanning surface with the opposite wall, or a larger-area mosquito-killing scanning surface with two opposite walls. As depicted in FIG. 9, when the device is installed on a rotary pan-tilt head, the rotary pan-tilt head drives the device to rotate while scanning and killing mosquitoes, enabling it to directly cover a larger-area conical range for mosquito-killing scanning.

The structure of the present application is compact and easy to carry, and can cooperate with the rotation of the pan-tilt head to form a larger three-dimensional scanning and mosquito-killing space with a maximum range of 360 degrees. Meanwhile, through the cooperation of the reflecting mirror between the laser radar and the high-power laser emitter, both the scanning action and the killing action can be realized by using the galvanometer lens of a single set of galvanometer module, which results in low production cost and easy maintenance. Moreover, the structure of the present application is suitable for both indoor and outdoor use, featuring rich application scenarios and a wide coverage area.

The above descriptions are merely preferred embodiments of the utility model and are not intended to limit the utility model. Any minor modifications, equivalent substitutions and improvements made to the above embodiments based on the technical essence of the utility model shall all fall within the protection scope of the technical solution of the utility model.

The invention claimed is:

1. A portable laser mosquito extermination device, characterized by comprising a protective housing and a galvanometer drive module fixed to a central fixing component, wherein a laser radar is further disposed on one side of the central fixing component; the galvanometer drive module is drivingly connected with a rotatable galvanometer lens; a high-power laser module is further fixedly mounted on the central fixing component; the laser radar consists of an infrared laser receiving unit and an infrared laser emitting unit;

the central fixing component is further equipped with a main dichroic mirror corresponding to the infrared laser emitting unit and the high-power laser module; the laser emitted by the high-power laser module, the laser emitted by the infrared laser emitting unit, and the returned light received by the infrared laser receiving unit are all controlled in terms of reflection angle by the same galvanometer lens, and their reflection points on the galvanometer lens can either completely coincide or be located on the same straight line;

the included angle between the laser emitted by the infrared laser emitting unit and the laser emitted by the high-power laser module, after both are reflected by the galvanometer lens, is 0-20 degrees.

2. The portable laser mosquito extermination device according to claim 1, characterized in that: a partition plate is further mounted on the central fixing component, wherein the partition plate is capable of separating the infrared laser receiving unit and the infrared laser emitting unit to the left and right sides respectively.

3. The portable laser mosquito extermination device according to claim 2, characterized in that: when the main dichroic mirror is of a long-wave high-reflection and short-wave high-transmission type, the laser emitted by the infrared laser emitting unit can be reflected by the main dichroic mirror and then projected onto a reflection area on the galvanometer lens, while the laser emitted by the high-power laser module can pass through the main dichroic mirror and be transmitted onto the same reflection area on the galvanometer lens;

when the main dichroic mirror is of a long-wave high-transmission and short-wave high-reflection type, the laser emitted by the infrared laser emitting unit can pass through the main dichroic mirror and be transmitted onto the reflection area on the galvanometer lens, while the laser emitted by the high-power laser module can be reflected by the main dichroic mirror and then projected onto the same reflection area on the galvanometer lens.

4. The portable laser mosquito extermination device according to claim 1, characterized in that: the wavelength of the laser emitted by the infrared laser emitting unit is 700-1800 nm, and the wavelength of the laser emitted by the high-power laser module is different from that of the laser emitted by the infrared laser emitting unit.

5. The portable laser mosquito extermination device according to claim 1, characterized in that: the protective housing is composed of a box body and side covers, wherein the box body and the side covers are fixedly connected by means of snap fasteners or screws; a waterproof rubber ring is further installed between the box body and the side covers; the front side of the box body is further provided with control buttons and a laser transceiver window;

the front side of the box body is further provided with a pyroelectric sensor, an ultrasonic sensor, or an area-array laser radar, all of which are used for identifying large-sized organisms.

6. The portable laser mosquito extermination device according to claim 1, characterized in that: a connecting base with a built-in magnet is arranged on the back of the protective housing, and the connecting base can be magnetically attached to an adjustable support or a rotary pan-tilt head.

7. The portable laser mosquito extermination device according to claim 3, characterized in that: the main dichroic mirror is of a long-wave high-reflection and short-wave high-transmission type; the high-power laser module is composed of a high-power laser emitter, a reflecting mirror and a lens group; the laser emitted by the high-power laser emitter is focused or collimated by the lens group, then passes through the reflecting mirror and the main dichroic mirror, and is finally projected onto the galvanometer lens;

the infrared laser emitting unit of the laser radar includes a laser diode and at least one first convex lens; the laser emitted by the laser diode is collimated by the first convex lens, then passes through the main dichroic mirror, and is reflected by the galvanometer lens to the outside of the laser transceiver window;

the infrared laser receiving unit includes a photosensitive sensor and at least one second convex lens; the main dichroic mirror reflects the returned light from the galvanometer lens to the second convex lens, which focuses the light onto the photosensitive sensor, wherein the reflection areas of the returned light and the laser emitted by the laser diode on the galvanometer lens are different and located on both sides of the partition plate.

8. The portable laser mosquito extermination device according to claim 7, characterized in that: the high-power laser module further includes a fixing frame; the left and right sides of the top of the fixing frame are respectively provided with a first fixing inclined surface and a second fixing inclined surface; the main dichroic mirror is attached to the first fixing inclined surface; the reflecting mirror is fixed on the second fixing inclined surface; and the included angle between the reflecting mirror and the main dichroic mirror is 30 degrees-60 degrees.

* * * * *